US007277952B2

(12) United States Patent
Nishanov et al.

(10) Patent No.: US 7,277,952 B2
(45) Date of Patent: Oct. 2, 2007

(54) DISTRIBUTED SYSTEM RESOURCE PROTECTION VIA ARBITRATION AND OWNERSHIP

(75) Inventors: Gor Nishanov, Redmond, WA (US); Peter William Wieland, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 654 days.

(21) Appl. No.: 09/967,350

(22) Filed: Sep. 28, 2001

(65) Prior Publication Data

US 2003/0065782 A1 Apr. 3, 2003

(51) Int. Cl.
*G06F 15/16* (2006.01)
*G06F 15/173* (2006.01)

(52) U.S. Cl. ............... 709/229; 709/213; 709/217; 709/223; 709/226; 710/240

(58) Field of Classification Search ............ 709/226, 709/229, 220; 710/240, 242
See application file for complete search history.

(56) References Cited

U.S. PATENT DOCUMENTS

| | | | |
|---|---|---|---|
| 5,280,627 A | 1/1994 | Flaherty et al. | |
| 5,301,283 A * | 4/1994 | Thacker et al. ............ | 710/116 |
| 5,404,527 A | 4/1995 | Irwin et al. | |
| 5,553,239 A | 9/1996 | Heath et al. | |
| 5,555,375 A | 9/1996 | Sudama et al. | |
| 5,659,748 A | 8/1997 | Kennedy | |
| 5,673,384 A | 9/1997 | Hepner et al. | |
| 5,727,206 A | 3/1998 | Fish et al. | |
| 5,754,821 A | 5/1998 | Cripe et al. | |
| 5,781,910 A | 7/1998 | Gostanian et al. | |
| 5,828,876 A | 10/1998 | Fish et al. | |
| 5,828,889 A | 10/1998 | Moiin et al. | |
| 5,828,961 A | 10/1998 | Subramamian et al. | |

(Continued)

FOREIGN PATENT DOCUMENTS

EP 750256 12/1996

(Continued)

OTHER PUBLICATIONS

Holton et al., *XFS: A Next Generation Journalled 64-Bit Filesystem With Guaranteed Rate I/O*, SiliconGraphics (Mar. 15, 1999).

(Continued)

*Primary Examiner*—Bunjob Jaroenchonwanit
*Assistant Examiner*—Dohm Chankong
(74) *Attorney, Agent, or Firm*—Workman Nydegger

(57) ABSTRACT

In a distributed system, a resource such as a storage device is protected by an owner node's exclusive access to it, wherein exclusive access is established via a persistent reservation on the resource. A persistent reservation is never removed, however the owner node's persistent reservation may be challenged in an arbitration process, to take it away from a failed owner node. A challenger node challenges by changing an owner's access key (that establishes the persistent reservation) to a challenge key, delaying, and determining whether the owner restored the owner's access key during the delay, because a properly operating owner replaces a challenge key with its owner access key. If the owner fails to restore its owner access key, the challenger node becomes the new resource owner by replacing the challenge key with an owner access key of the challenger node. The key may include additional information to provide extensibility.

31 Claims, 9 Drawing Sheets

U.S. PATENT DOCUMENTS

| | | | |
|---|---|---|---|
| 5,835,784 A | | 11/1998 | Gillespie et al. |
| 5,892,913 A | | 4/1999 | Adiga et al. |
| 5,893,086 A | | 4/1999 | Schmuck et al. |
| 5,909,540 A | | 6/1999 | Carter et al. |
| 5,917,998 A | | 6/1999 | Cabrera et al. |
| 5,918,229 A | | 6/1999 | Davis et al. |
| 5,927,050 A | | 7/1999 | Houck et al. |
| 5,940,838 A | | 8/1999 | Schmuck et al. |
| 5,946,686 A | | 8/1999 | Schmuck et al. |
| 5,948,109 A | | 9/1999 | Moiin et al. |
| 5,968,154 A | * | 10/1999 | Cho ..................... 710/119 |
| 5,974,547 A | | 10/1999 | Klimenko |
| 5,996,075 A | | 11/1999 | Matena |
| 5,999,712 A | | 12/1999 | Moiin et al. |
| 5,999,978 A | | 12/1999 | Angal et al. |
| 6,014,669 A | | 1/2000 | Slaughter et al. |
| 6,061,740 A | | 5/2000 | Ferguson et al. |
| 6,108,699 A | | 8/2000 | Moiin |
| 6,108,781 A | | 8/2000 | Jayakumar |
| 6,192,401 B1 | | 2/2001 | Modiri et al. |
| 6,279,032 B1 | * | 8/2001 | Short et al. ............... 709/209 |
| 6,286,056 B1 | * | 9/2001 | Edgar et al. ................ 710/5 |
| 6,301,462 B1 | | 10/2001 | Freeman et al. |
| 6,311,217 B1 | | 10/2001 | Ehlinger et al. |
| 6,314,526 B1 | | 11/2001 | Arendt et al. |
| 6,360,331 B2 | | 3/2002 | Vert et al. |
| 6,363,495 B1 | | 3/2002 | MacKenzie et al. |
| 6,401,120 B1 | * | 6/2002 | Gamache et al. ........... 709/226 |
| 6,427,163 B1 | | 7/2002 | Arendt et al. |
| 6,438,705 B1 | | 8/2002 | Chao et al. |
| 6,463,532 B1 | * | 10/2002 | Reuter et al. ............... 709/224 |
| 6,487,622 B1 | * | 11/2002 | Coskrey et al. ............. 710/241 |
| 6,553,387 B1 | | 4/2003 | Cabrera et al. |
| 6,654,902 B1 | * | 11/2003 | Brunelle et al. ............... 714/4 |
| 6,658,587 B1 | * | 12/2003 | Pramanick et al. ............ 714/5 |
| 6,662,219 B1 | | 12/2003 | Nishanov et al. |
| 6,681,251 B1 | | 1/2004 | Leymann et al. |
| 6,691,139 B2 | | 2/2004 | Ganesh et al. |
| 6,701,332 B1 | | 3/2004 | Vella |
| 6,701,453 B2 | | 3/2004 | Chrabaszcz |
| 6,782,416 B2 | * | 8/2004 | Cochran et al. ............. 709/208 |
| 6,804,703 B1 | * | 10/2004 | Allen et al. ................. 709/216 |
| 6,807,557 B1 | | 10/2004 | Novaes et al. |
| 6,862,613 B1 | * | 3/2005 | Kumar et al. ............... 709/220 |
| 6,954,881 B1 | * | 10/2005 | Flynn Jr. et al. .............. 714/43 |
| 2001/0014097 A1 | | 8/2001 | Beck et al. |
| 2002/0199113 A1 | * | 12/2002 | Pfister et al. ............... 713/200 |

FOREIGN PATENT DOCUMENTS

| | | |
|---|---|---|
| EP | 0760503 | 3/1997 |
| EP | 0887731 | 12/1998 |

OTHER PUBLICATIONS

Carr, Richard, "The Tandem Global Update Protocol," *Tandem Systems Review*, vol. 1, No. 2, pp. 74-85 (Jun. 1995).

Lamport, Leslie, *The Part-Time Parliament*, Digital Equipment Corporation (Sep. 1, 1989).

Lamport, Leslie, *A Fast Mutual Exclusion Algorithm*, Digital Equipment Corporation (Nov. 14, 1985).

Basagni, Stefano, "Distributed Clustering for Ad Hoc Networks", Center for Advanced Telecommunications Systems ad Services, Erik Jonsson School of Engineering and Computer Science, 1999.

Basagni, Stefano, "Distributed and Mobility-Adaptive Clustering for Multimedia Support in Multi-Hop Wireless Networks", Center for Advanced Telecommunications Systems and Services, Erik Jonsson School of Engineering and Computer Science, 1999, pp. 889-893.

Chandra, Tushar Deepak et al., "On the Impossibility of Group Membership", INRIA, Research Report No. 2782, Jan. 1996, pp. 1-11.

Sun Microsystems, "Sun Cluster Architecture: A White Paper", Cluster Computing, Dec. 1999, pp. 331-338.

Cheung, Shun Yan et al., "Multi-Dimensional Voting: A General Method for Implementing Synchronization in Distributed Systems", School of Information and Computer Science, Georgia Institute of Technology, Distributed Computing Systems, Jun. 1990, pp. 362-369.

Gifford, David K., "Weighted Voting for Replicated Data", Stanford University and Xerox Palo Alto Research Center, 1979, pp. 150-159.

Vogels, Werner et al., "The Design and Architecture of the Microsoft Cluster Service", Proceedings of FTCS '98, http://www.cs.cornell.edu/rdc/mscs/ftcs28/ (Jun. 23-25, 1998), printed Jul. 25, 2000.

"Sun Cluster 2.2", Sun Microsystems, Inc., http://www.sun.com/software/solaris/ds/ds-suncluster/index.html, printed Oct. 26, 1999.

Oki, Brian et al., "Viewstamped Replication: A New Primary Copy Method to Support Highly-Available Distributed Systems", Proceedings of the 7th ACM Symposium on Principles of Distributed Computing, 1988, pp. 8-17.

Bernstein, Philip A., "Replicated Data", Concurrency Control and Recovery in Database Systems, Chapter 8, Addison-Wesley Publishing Company, 1987, pp. 265-311.

Gafni, Eli et al., "Disk Paxos", Compaq Systems Research Center, Jul. 4, 2000.

Gamache, Rod et al., "Windows NT Clustering Service", Oct. 1998, pp. 55-62.

* cited by examiner

DISTRIBUTED SYSTEM RESOURCE PROTECTION VIA ARBITRATION AND OWNERSHIP

FIELD OF THE INVENTION

The invention relates generally to distributed computing systems, and more particularly to protecting resources such as storage devices in distributed systems.

BACKGROUND OF THE INVENTION

Storage area networks and server clustering technology allow multiple host computers to connect to the same array of storage devices, typically disks. However, such an arrangement can lead to serious problems when the disk is improperly accessed. For example, simultaneous write and read accesses by different hosts may corrupt a disk's data, potentially leading to very serious consequences.

One solution to this problem of protecting a shared storage device (or devices) is to give exclusive access to the device to one computer at a time. For example, in U.S. patent application Ser. No. 08/963,050, entitled "Method and System for Quorum Resource Arbitration in a Server Cluster," assigned to the same assignee as the present invention, cluster nodes arbitrate for exclusive ownership of a quorum resource, which ensures that only one unique incarnation of a cluster can exist at any given time, since only one node can exclusively possess the quorum resource. As another example, in U.S. patent application Ser. No. 09/277,450, entitled "Method and System for Consistent Cluster Operational Data in a Server Cluster Using a Quorum of Replicas," assigned to the same assignee as the present invention, the quorum resource is not limited to a single device, but rather is comprised of multiple replica members. A cluster may be formed and continue to operate as long as one server node possesses a quorum (majority) of the replica members.

In both of these above examples, the node that initially obtains ownership of the quorum resource forms and represents the cluster, and access to the quorum resource (e.g., reads and writes to the disk or disks) is through the owning node. This protects against data corruption.

However, in clustering and distributed system technology, a problem sometimes arises when nodes lose their ability to communicate with other nodes, e.g., due to the crash of a node, or some other type of failure such as a network communication failure. As a result, the nodes that do not own the resource are configured to challenge for resource ownership in case the owning node has failed. To this end, an appropriate arbitration process on each node enables another node to challenge for ownership of each owned resource by temporarily breaking the owning node's exclusive reservation, (e.g., by SCSI bus reset or bus device reset commands), delaying, and then requesting an exclusive reservation. During the delay, the owning node is given an opportunity to defend and persist its exclusive reservation, whereby if the node is operating correctly, it replaces its exclusive reservation. If the owning node is not able to replace its reservation during the delay, the challenging node's request for exclusive access following the delay succeeds, whereby the challenging node becomes the new owner.

While the above-described mechanisms are excellent for sets of nodes that implement the arbitration rules, the breaking of the reservation leaves the resource in an unreserved state until the challenger or owner can obtain an exclusive reservation. At that time, the resource is vulnerable to being improperly accessed. Further, a third party computing device may independently break (e.g., for various unrelated purposes) the owning node's exclusive reservation. For example, in a SCSI-2 configuration, a SCSI bus reset command used to break the reservation. If a third party computing device initiates a SCSI bus reset or SCSI bus device reset, then the owning node's exclusive reservation is temporarily lost, and access to the disk can be improperly obtained, making the disk vulnerable to simultaneous access, data corruption and so forth.

SUMMARY OF THE INVENTION

Briefly, the present invention provides a method and system by which a resource such as a storage device may be protected by exclusive access through a persistent reservation that is not removed, even temporarily. For example, in a SCSI-3 implementation, a SCSI bus reset or bus device reset does not temporarily remove the persistent reservation. When a computing device (node) that owns the resource is operating correctly, the owning node is able to defend its exclusive access, yet ownership can be challenged without removing the reservation so that a challenging node can take over ownership when the formerly owning node is not operating correctly.

To this end, an arbitration process is distributed to the nodes that may challenge for and own the resource. Via the arbitration process, one node places a persistent reservation and obtains exclusive ownership of the resource. Once reserved, the owner maintains the ownership by checking periodically or on any access failure to determine whether the owner's persistent reservation is being challenged. If so the owner defends against the challenge. In one implementation, a reservation key is maintained by (or in association with) the storage device, and it is the reservation key that establishes the persistent reservation. If the reservation key is the owner's key, the owner has exclusive access to the disk.

Each challenger challenges by preempting the owner's reservation. In the implementation wherein a reservation key corresponds to the persistent reservation, the challenger preempts the reservation by replacing the owner's key with a challenge key. After a delay that is sufficient for a properly operating owner to restore the owner's persistent reservation, e.g., put back its own key, the challenger checks whether the owner has restored the owner's reservation key. If so, the challenge has failed, otherwise the challenger changes the reservation to its own ownership reservation, e.g., exclusively reserves the resource via by changing the challenge key to its own ownership key.

Multiple nodes may be present that are each capable of challenging for ownership, and the arbitration process of one node may be arranged to not challenge when another challenge is in progress, at least for a time that allows the other challenge to succeed. Pending challenges may be differentiated from ownership based on how the persistent reservation is modified, e.g., a challenge key may be distinguished from an ownership key.

In the reservation key implementation, the ownership and challenge keys are based on unique identifiers for each node that may challenge and exclusively own the resource. To this end, the reservation key is divided into fields including a ReserverID field and an OwnerID field. The resource is owned when the same identifier is in both fields, and is being challenged when a challenger's identifier is in the ReserverID field and the owner's identifier is in the OwnerID field.

To challenge a persistent reservation, a challenging node writes its identifier in the ReserverId field, and then delays. When an owner checks its reservation by checking the key, (during this delay if operating properly), the owner sees the challenge reservation via the ReserverId field, and puts its own identifier back into the ReserverId field, whereby the owner maintains its ownership reservation and defends against the challenge.

If, however, the owner is not properly operating, the owner is unable to restore its ownership during the challenge delay time. If this happens, at the end of the delay, the challenging node writes its identifier into the OwnerID field and takes over ownership of the device. If the former owner is able to recover and detects the new owner, the former owner gives up the device and considers it lost, possibly becoming a challenger for it. Note that at no time is exclusive access lost, even temporarily, whereby the resource is protected from access by other computing devices.

The present invention may be extended through the use of other fields in the key. For example, a bid field can be used to weight a challenge, and the owner and other challengers may act based on the bid, such as by not defending against a sufficiently higher bid, or replacing a pending challenge having a weaker bid with a challenge having a stronger bid. A membership generation key field may be used when a resource is shared among a group of members, so as to change the key when a member leaves the group and thereby exclude that member from further access.

Other advantages will become apparent from the following detailed description when taken in conjunction with the drawings, in which:

DETAILED DESCRIPTION

Exemplary Operating Environment

Figure 1:
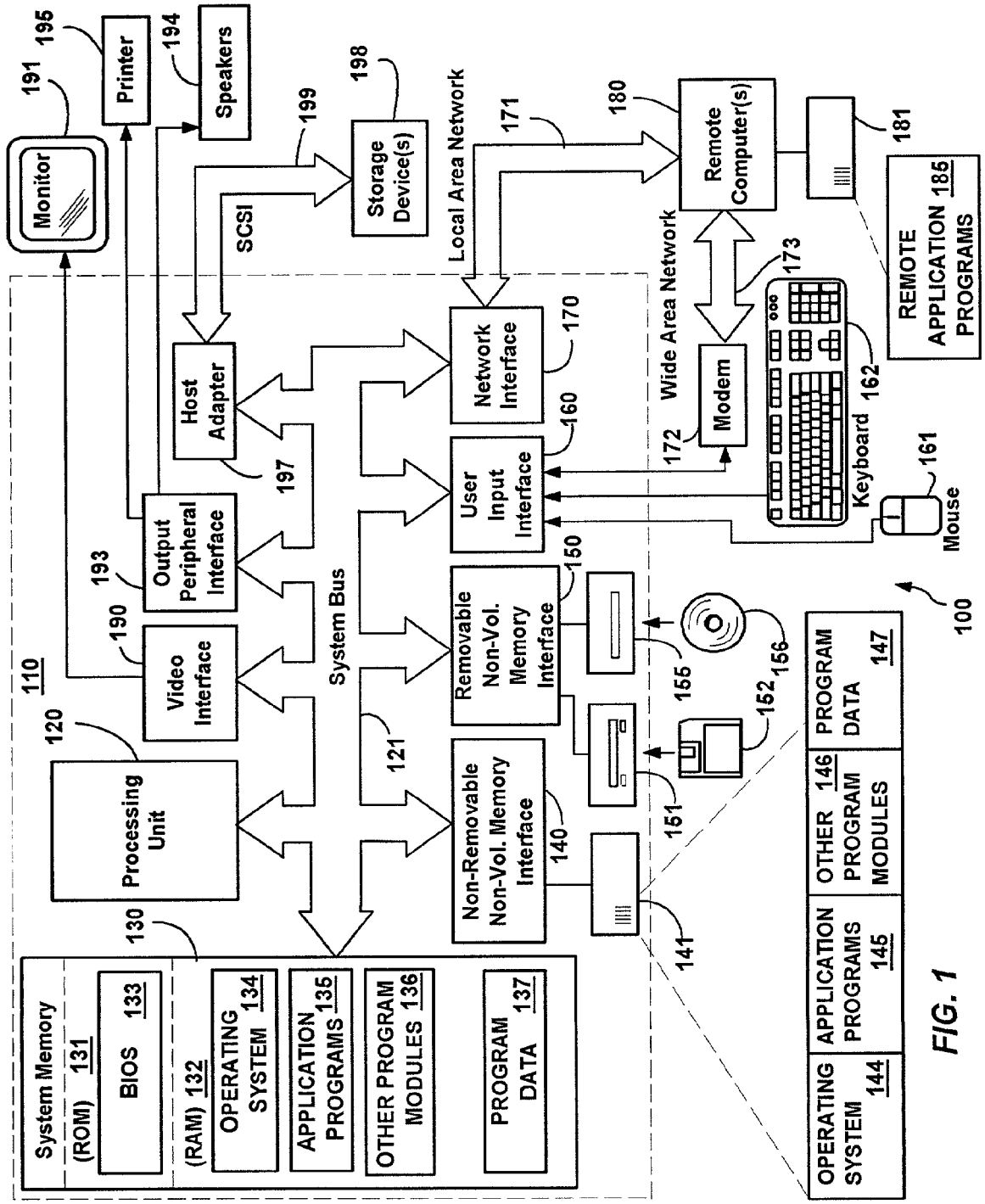
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. in FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 194 and printer 195, which may be connected through a output peripheral interface 193.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A preferred system 110 further includes a host adapter 197 or the like which connects the system bus 121 to a storage device or devices 198, comprising one or more independent, shared persistent memory storage devices. The connection may be as via a SCSI (Small Computer Systems Interface) bus 199 or the like. Other ways of connecting cluster systems to storage devices, including Fibre Channel, are equivalent. Indeed, one alternative way to connect storage devices is via a network connection, as described in U.S. patent application Ser. No. 09/260,194 entitled "Method and System for Remote Access of Computer Devices," assigned to the assignee of the present invention.

Resource Protection

The present invention will be primarily described with respect to distributed systems such as server clusters having one or more SCSI disks to which multiple computing devices (nodes) may attach, and with examples of SCSI-3 protocol features. Notwithstanding, the present invention is not limited to clusters, one disk, multiple disks, the SCSI-3 protocol or even SCSI in general, but as will be understood, may be implemented in many ways using contemporary computing technology. For example, instead of using SCSI-3 commands and SCSI-3 disks, customized computer hardware associated with any type of storage unit or units may implement the features and respond appropriately to the types of commands described herein. Indeed, the present invention is applicable to resources other than storage devices in which exclusive access is desired. Further, for purposes of simplicity, the present invention will be described with respect to protecting the data integrity of a single logical unit of storage such as a volume or group of sectors on a disk, however it is understood that the present invention may be used with any number and/or arrangement of resources/logical units. For example, as will be understood, certain sectors of a disk may be protected by exclusive access via the present invention, while other sectors on the same disk are not protected.

Figure 2:
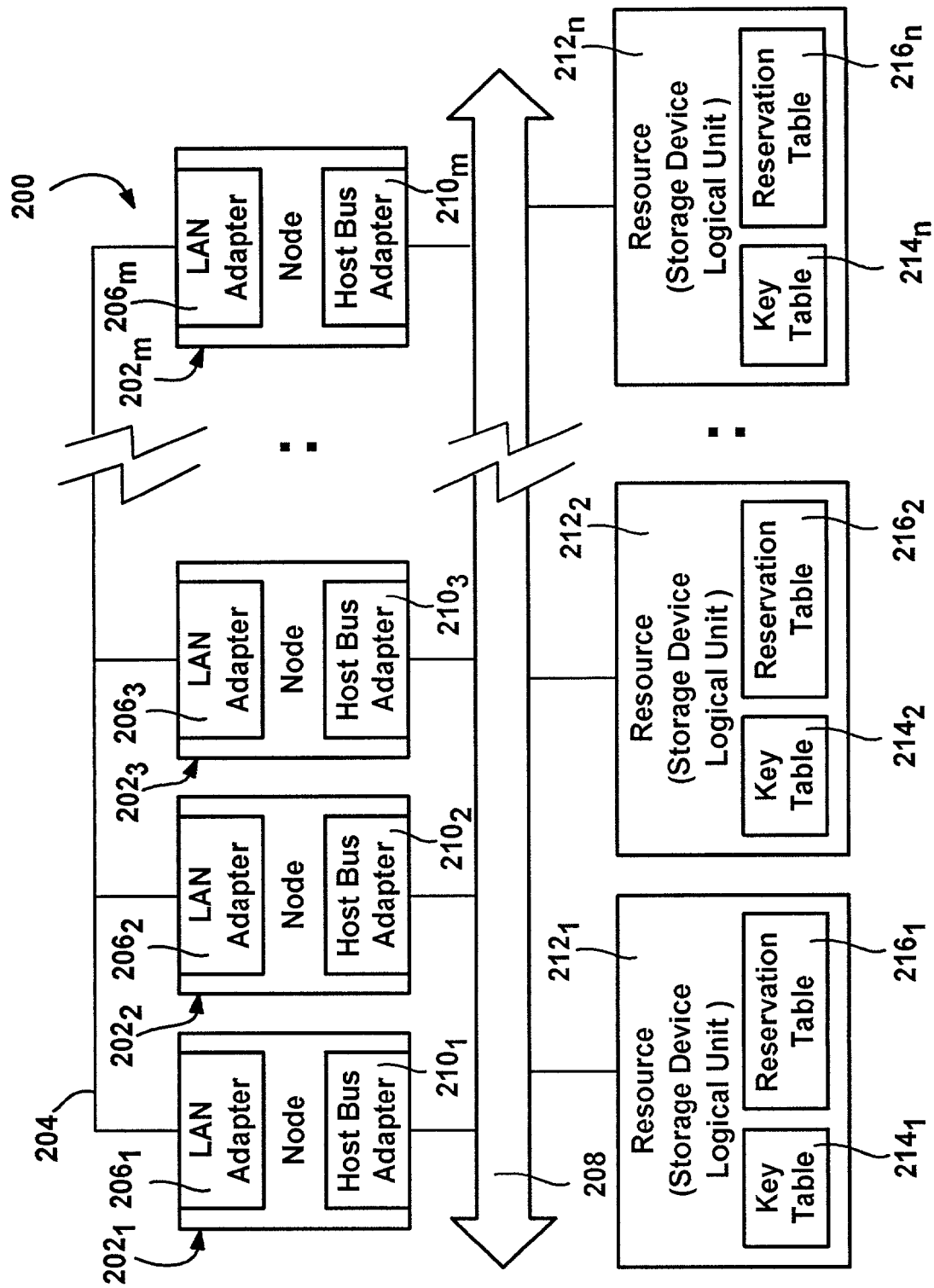
FIG. 2 is a block diagram representing a distributed system, such as a server cluster having a plurality of nodes connected to a plurality of storage devices, into which the present invention may be incorporated.

FIG. 2 generally represents a distributed system 200 comprising a number of nodes $202_1$-$202_m$ networked together, such as over a LAN communications link 204, via respective LAN adapters $206_1$-$206_m$. The nodes $202_1$-$202_m$ are also connected (such as via a SCSI bus 208) via respective host bus adapters $210_1$-$210_m$ to resources such as one or more commonly accessible storage devices $212_1$-$212_n$, (each with at least one logical unit of access thereon). As can be readily appreciated, one of these nodes (e.g., the node $200_1$) may correspond to the computing device 110 of FIG. 1, with other components shown in FIG. 1 corresponding to their like-named (but differently numbered) counterparts shown in FIG. 2. As also shown in FIG. 2, each resource (e.g., logical unit of a storage device) includes or is otherwise associated with a key table and a reservation table, e.g., the storage device $212_1$ has maintained therewith a key table $214_1$, a reservation table $216_1$, and so on.

Figure 3:
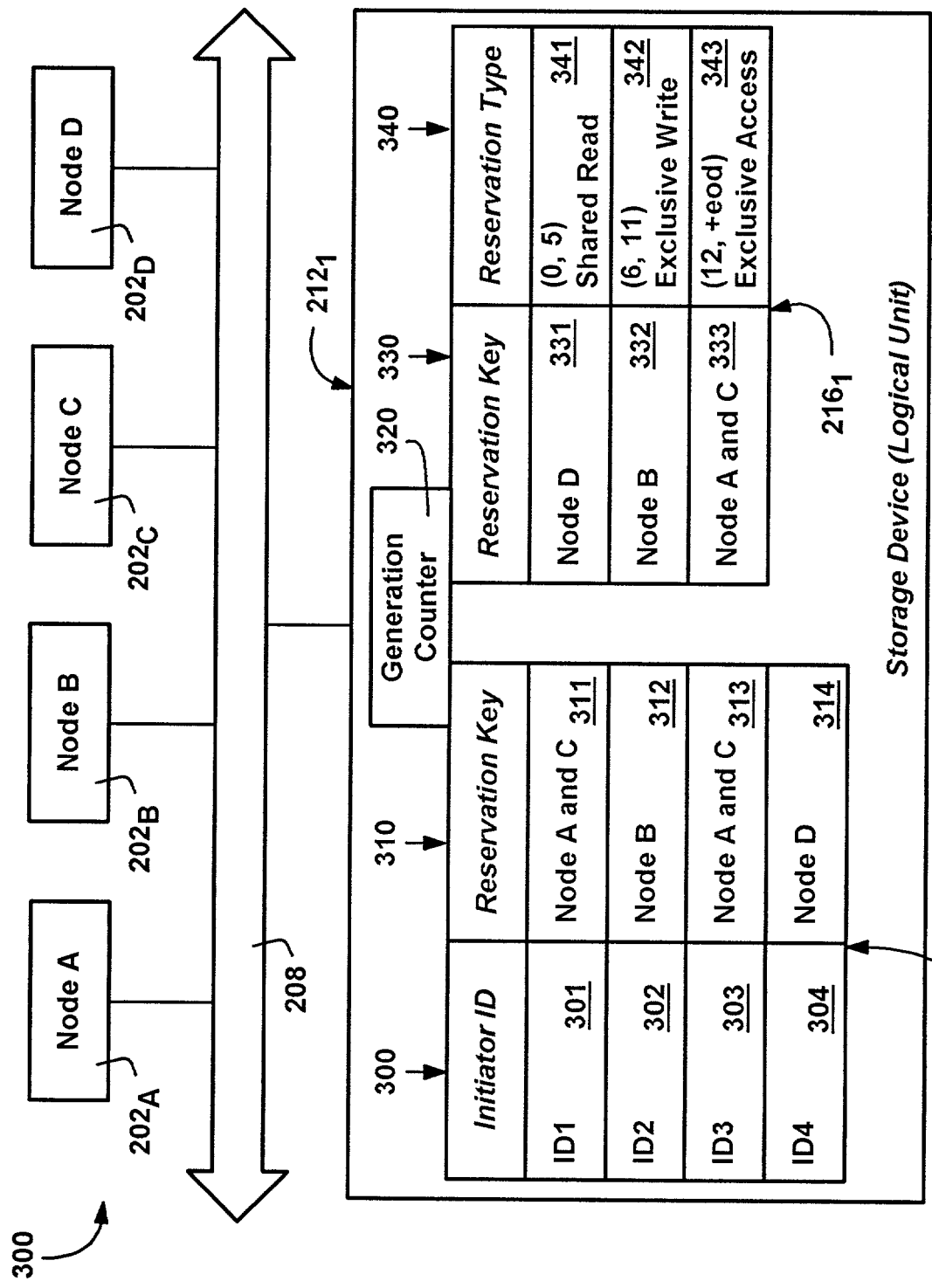
FIG. 3 is a representation of tables maintained for a resource such as a logical unit (e.g., a volume) of a storage device including keys that establish persistent reservations of that resource in accordance with one aspect of the present invention.

FIG. 3 represents in more detail a key table (e.g., $214_1$) and a reservation table (e.g., $216_1$) of one or more of the logical units of storage, (e.g., the storage device $212_1$, which will be generally referred to as a disk for simplicity). In general, each node that wants access to the disk $212_1$ has an identifier (unique to the network) and registers a reservation key (e.g., a 64 bit value) with the disk, which is stored in the key table based on the identifier. The key table maps initiators 300 to their reservation keys 310 via initiator fields 301-304 and reservation key fields 311-314. Note that while four such initiator to key mappings are shown, virtually any number is possible, (up to some practical limit of entries that will fit on the disk). In the SCSI-3 protocol, such a registration is accomplished by a Register (64 bit key) command, which adds the specified key to the key table if there is not already an entry for the identifier of the initiator node. If there is already an entry with the initiator's identifier, the Register command modifies the existing entry in the key table. A generation counter 320 is incremented when a register command is received.

As also shown in FIG. 3, a reservation table (e.g., $216_1$) is maintained that maps reservation key values 330 to data 340 that describes a type of persistent reservation. More particularly, an initiator with a registered key can put a reservation on the disk and specify the type and extent of the reservation desired, (e.g., the mode of protection and the size in sectors or the like to reserve). FIG. 3 shows various reservation keys 331-333 mapped to their type of reservations 341-343, and although three mappings are shown, it is understood that any practical number is possible. Note that the values for the extent of the reservation may represent any suitable units, such as sectors, and that "+eod" represents the end of the disk. As described below, these reservations are persistent, and for example, are not cleared by bus reset or bus device reset commands. Note that anytime an already registered initiator changes its reservation key, any existing persistent reservations for the initiator receive the new reservation key.

In the SCSI-3 protocol, to place a persistent reservation on some or all of the logical unit, a Reserve (scope, type) command may be used. This command adds the persistent reservation for the initiator with a registered key if it does not conflict with any existing reservations on the device. The scope variable may specify the logical unit, the extent of the reservation, and other information, while the type variable may be ReadShared, WriteExclusive, ReadExclusive, ExclusiveAccess or SharedAccess. To voluntarily remove a persistent reservation, a Release (scope, type) command is issued by the initiator with the same reservation key as the one associated with that particular reservation, as defined by (scope, type). The generation number (in counter 330) is not changed on a reserve or release command.

As generally represented in FIG. 3, a node may thus compute and register any reservation key and reservation type. Note that multiple initiators (nodes) can register with the same reservation key. Nodes having the same reservation key will share access rights associated with this key in the reservation table, which may allow for shared access to a device.

Another command that impacts the entries in these tables is a Preempt (reservation key with other reservation key, scope, type) command. The Preempt command removes any reservations from the reservations table that has the specified reservation key to preempt, and adds another reservation in its (or their) place based on the other reservation key, i.e., preempt sets a new reservation according to the scope/type specified. If there is no reservation with the reservation key specified for replacement, the command fails (which is a useful feature that provides an atomic test and change mechanism).

One other operation includes a Clear command, which removes all entries from the key and reservation tables. As described below, because there should always be an owner in normal operation, the clear command should not be used as part of the arbitration process of the present invention.

Figure 4A:
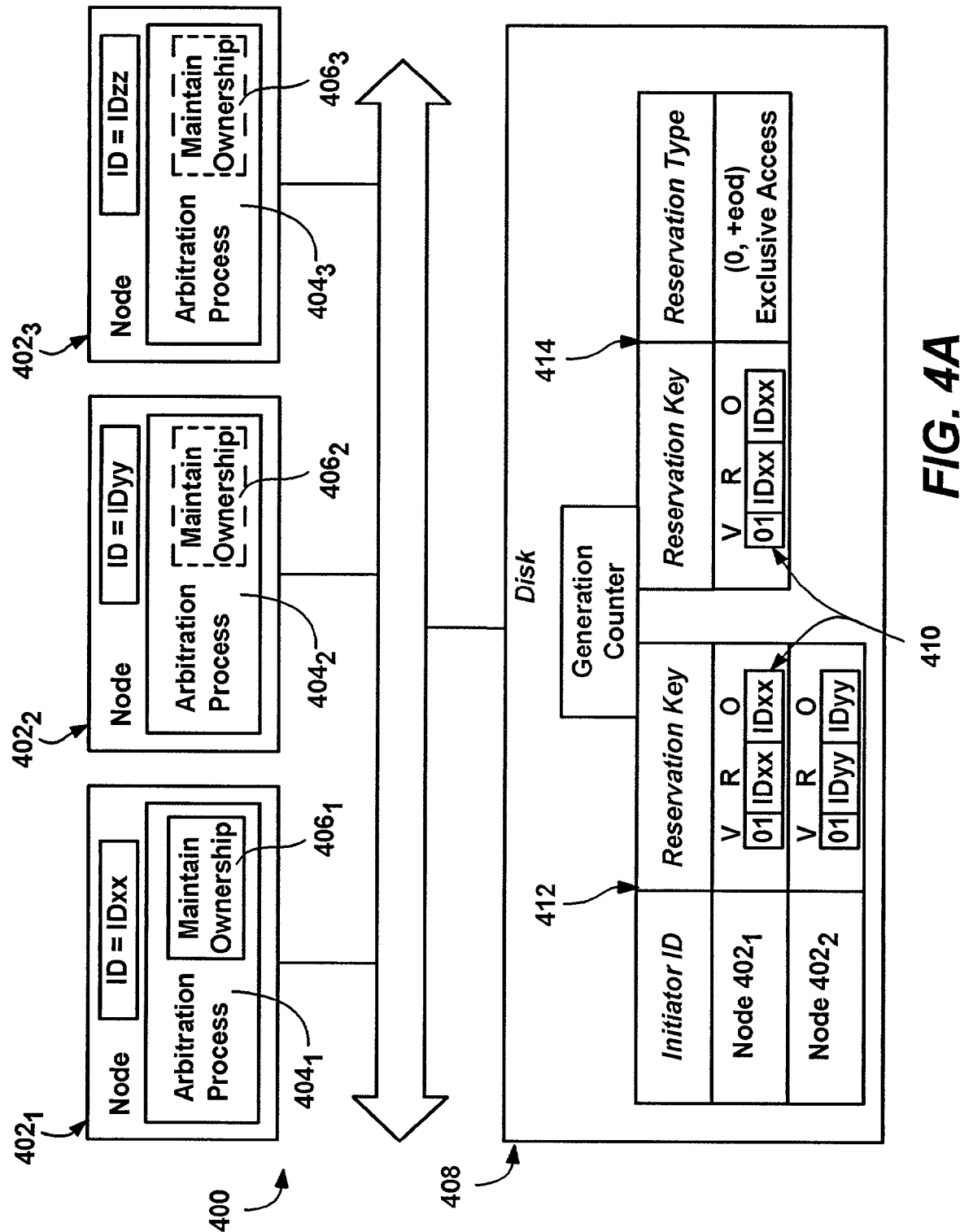
FIGS. 4A-4C are block diagrams representing nodes in a distributed system over time, the nodes owning and challenging for a resource (e.g., a disk) in accordance with one aspect of the present invention.
Figure 4B:
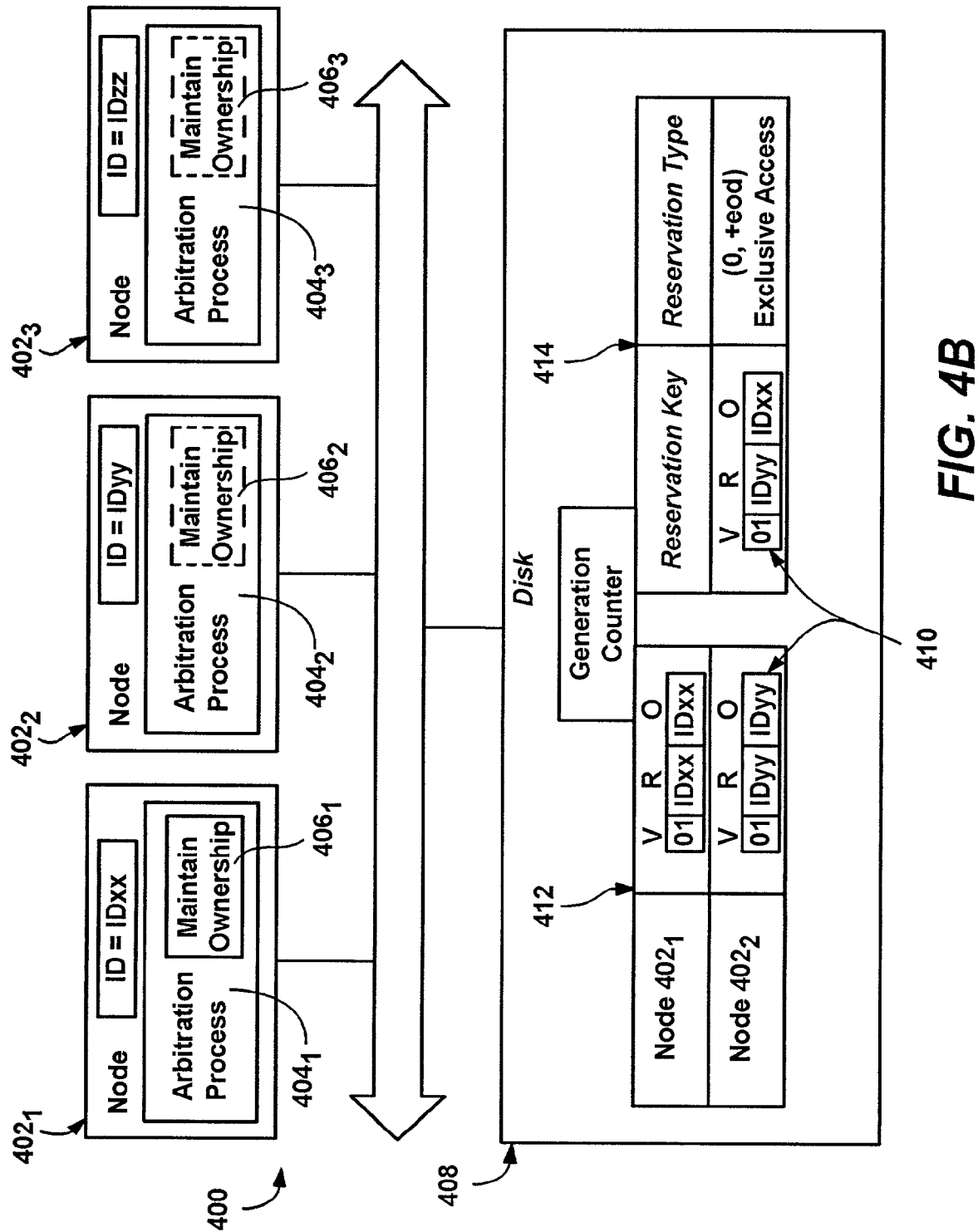
Figure 4C:
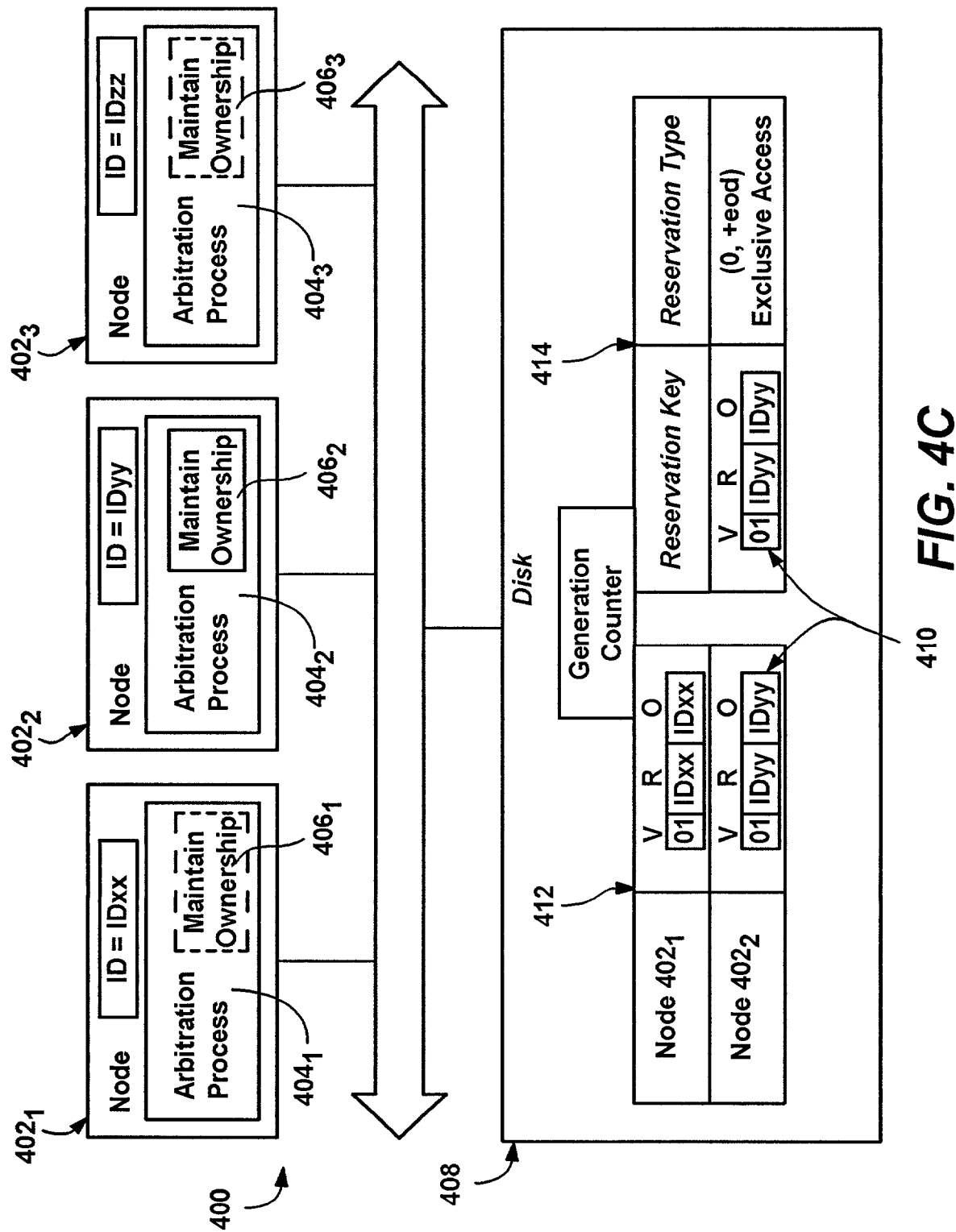

While FIG. 3 represents a number of initiators, keys and reservation types, for purposes of simplicity, the present invention will hereinafter be primarily described with respect to a limited number of nodes (e.g., three) arbitrating for ownership of only one storage device, a disk, having only one logical unit thereon. The disk will maintain the key table and the reservation table for that logical unit, and the reservation table will have at most one reservation key therein with a reservation type of exclusive access for the entire logical unit. FIGS. 4A-4C show such a simplified configuration 400.

In accordance with one aspect of the present invention, an instance of an arbitration process/mechanism is provided on each node capable of challenging for and owning the disk, wherein the distributed arbitration provides for exclusive ownership in a manner that does not allow a write to the disk when it is not supposed to be written. In general, this is accomplished by always having an exclusive owner, as described below. The arbitration process on each node does not allow a disk to be taken away from the rightful owner, unless and until the owner has performance failures or has crashed and thus is unable to defend ownership. Further, the arbitration process is such that if other challengers for the ownership of the disk are continuously challenging, and the owner is unable to defend ownership, one of the challengers will succeed within a finite and acceptable amount of time. Note that to ensure that there is always one owner, any nodes or other devices that may be connected to the storage device (e.g., any initiators on the SCSI bus) need to cooperate with the persistent reservation rules. For example, while not all such devices need not be arranged to challenge for ownership, none can issue a command (e.g., Clear) that simply removes the current owner's existing persistent reservation. However, such devices can issue bus reset and bus device reset commands, since those do not remove a persistent reservation.

FIGS. 4A-4C shows such nodes $402_1$-$402_3$, each having respective arbitration processes $404_1$-$404_3$. Each of the nodes $402_1$-$402_3$ also include a process for maintaining ownership of an owned device, represented in FIGS. 4A-4C as respective maintain ownership processes $406_1$-$406_3$. The maintain ownership processes $406_1$-$406_3$ may be considered to be part of the overall arbitration processes, and are generally represented this way in FIGS. 4A-4C, however these can be considered separate therefrom. Further, since there will be only one exclusive owner of the disk 408, only that one owner will be executing the maintain ownership process at any given time, as represented in FIG. 4A by the solid box $406_1$ (executing) in contrast to the dashed boxes $406_2$ and $406_3$ (not executing).

To implement the distributed arbitration process, among other things, each of the various challengers including the initial owner is uniquely identified by a small number (e.g., less than 32 bits) that each challenger (node) knows in advance. For example, an administrator using a higher level cluster service can assign the identifiers (IDs), shown in FIGS. 4A-4C as IDxx for node $402_1$, IDyy for node $402_2$ and IDzz for node $402_3$. Note that in some implementations, each ID cannot be a node identifier that is only unique within its cluster, as it is feasible to have multiple clusters connected to the same storage area network, whereby the cluster node identifiers of two different cluster nodes may conflict.

In accordance with another aspect of the present invention, a special multi-part reservation key 410 for use by the nodes is defined based on the nodes' IDs, having alternate embodiments/versions as described below. As generally represented in FIGS. 4A-4C, one alternative divides the reservation key 410 into three fields, a version field, comprising bits that identify this particular version of the reservation key 410, such as the first six bits of a sixty-four bit key), a ReserverId field, comprising the node identifier of the initiator who put this reservation on the device, and an OwnerId field, comprising the node identifier of the node that is considered to be the current owner of the device. In FIGS. 4A-4C, these fields may be identified by the letters V (version), R (ReserverId) and O (OwnerId) above the reservation key 410 in the key table 412 and reservation table 414. In one suitable version of the key, the reservation key 410 is sixty-four bits in length with six bits for the version, leaving up to twenty-nine bits for each node identifier field. Note that in alternative key configurations, a version field may be something other than six bits in length, and other fields are possible (as described below), whereby the node identifiers may be appropriately sized.

In accordance with one aspect of the present invention, the storage device is always reserved and reservations are never removed. Instead, a challenger preempts the owner's reservation with its challenge reservation, waits, and then attempts to convert its challenge reservation into an ownership reservation. To this end, the challenger writes its ID into the ReserverID field of the reservation key, while writing the owner's ID into the OwnerID field so that the owner's identity does not yet change. If the owner is unable to defend the challenge by restoring the owner's ID into the ReserverID field during the delay, the challenge reservation is converted to an ownership reservation by having the challenger write its key into both the ReserverID and the OwnerID fields, whereby the challenger becomes the new owner.

When the owner is properly operating, the challenger is not able to convert the challenge reservation into the ownership reservation, as described in more detail below. This is because when the owner is properly operating, the owner checks the reservation, periodically or upon any write operation failure (e.g., failed because a challenger has changed the reservation key). If the device is reserved with a challenge key, a properly operating owner preempts it with its own key in the ReserverID field. However, if the owner is operational, but for some reason the OwnerID has changed to a new owner, (e.g., the owner node is having some problem causing it to operate slowly), the now-replaced owner recognizes that it lost the ownership, and takes some other action, such as to terminate and possibly restart itself since it knows it is not operating properly, become a challenger, issue a message to an administrator, and so on.

Figure 5:
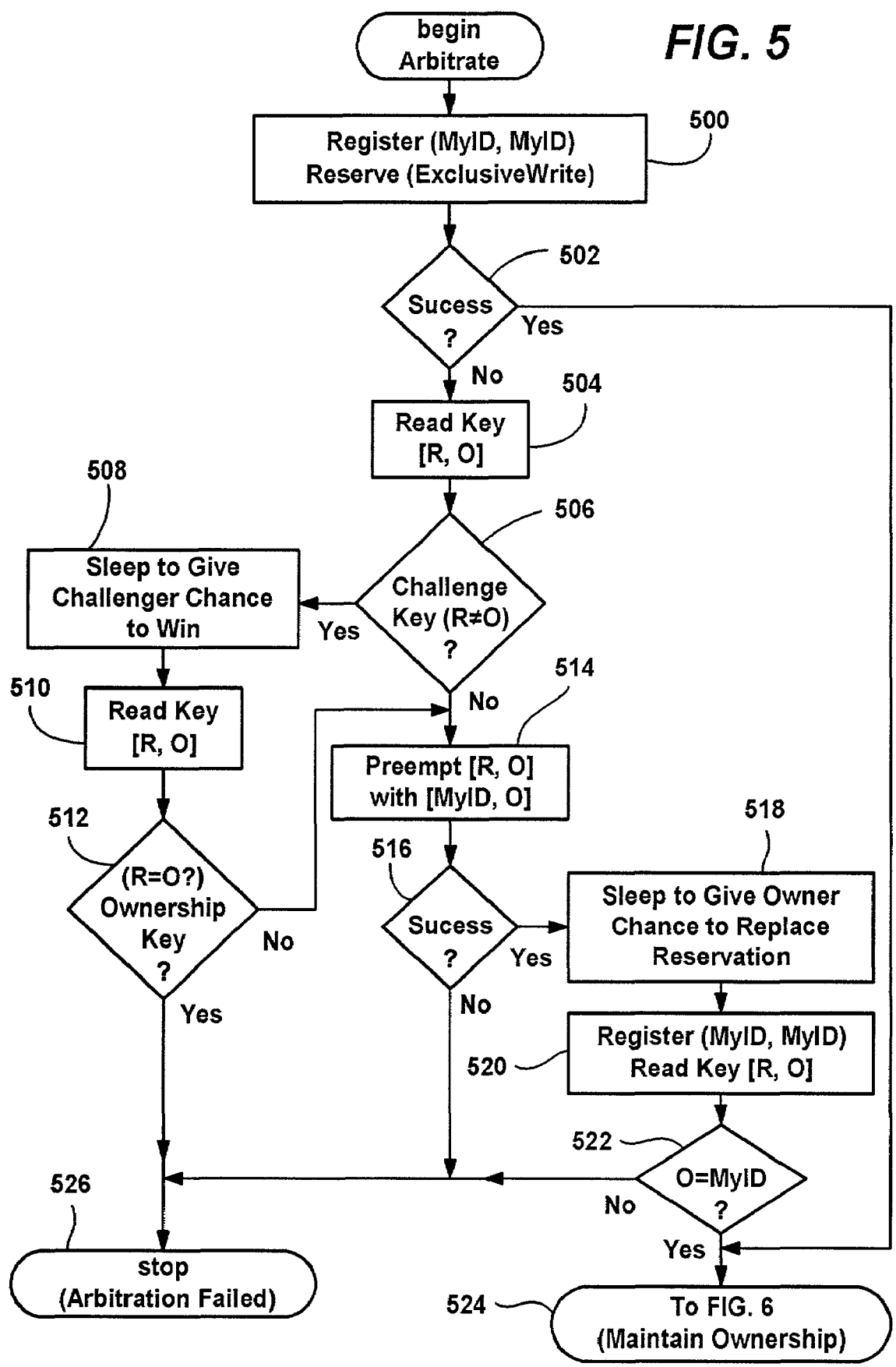
FIG. 5 is a flow diagram representing the general steps taken in arbitration, including challenging for ownership of a resource, in accordance with one aspect of the present invention.
Figure 6:
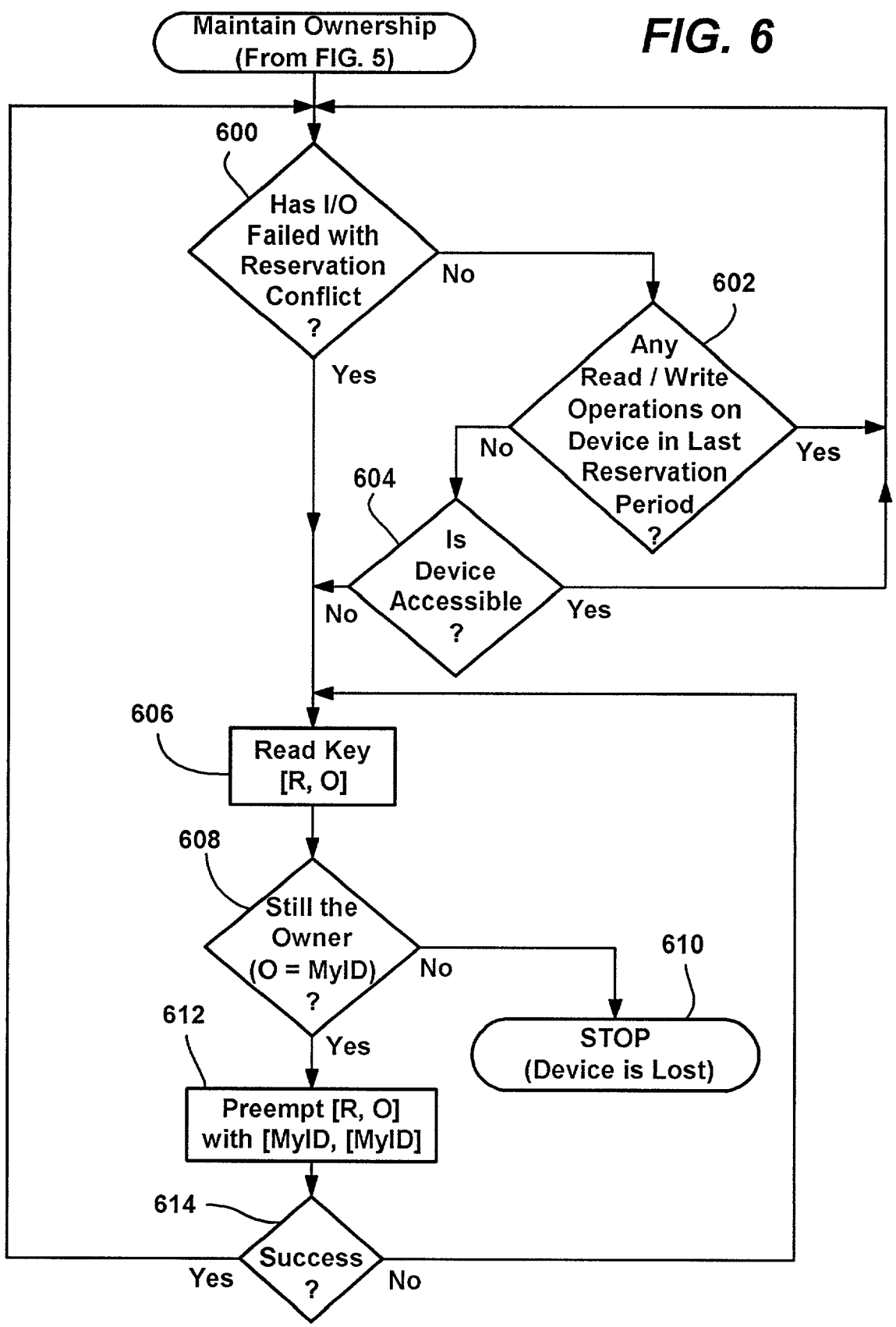
FIG. 6 is a flow diagram representing the general steps taken by an owner of a resource to defend ownership of that resource, in accordance with one aspect of the present invention.

Turning to an explanation of the operation of the present invention with particular reference to the block diagrams of FIGS. 4A-4C and the flow diagrams of FIGS. 5 and 6, FIG. 5 generally describes the arbitration process of a challenging node such as the node $402_2$ of FIGS. 4A-4C, while FIG. 6 generally describes the maintain ownership process, such as the maintain ownership process $406_1$ of an owning node $402_1$ (FIG. 4A). Note that the arbitration process may be periodically run, or it may be run selectively, such as if a node has reason to believe that the disk is not owned or that the owner may have failed. For example, in a server cluster, the arbitration process may be run by each node at startup, and whenever a node that does not own the resource is unable to communicate with the node that does own the resource.

At step 500 of FIG. 5, a node begins the process by registering a key based on its ID (MyID, MyID which in the example of FIGS. 4A-4C equals IDxx, IDxx for node $402_1$ or IDyy, IDyy for node $402_2$) in the key table, and then attempting to reserve the disk (the entire logical unit in this example) exclusively. If this reserve command succeeds, as represented in the test at step 502, then the disk was unreserved, whereby this node has become the owner and branches to step 524 to defend its ownership, described below with reference to FIG. 6. Note that as described above, the reserve command fails if it conflicts with an existing reservation. For purposes of the present example, assume that the node $402_1$ has previously performed steps 500 and 502, succeeded at step 502, and is maintaining ownership. As a result, when the node $402_2$ runs its arbitration process, it registers its key IDyy, IDyy at step 500, but its reservation attempt (also step 500) fails as detected by step 502. This is the state generally represented in FIG. 4A.

Since the reserve command failed for this node $402_2$, the disk is owned by another node, (node $402_1$), and the node $402_2$ that is running the arbitration process and has reached step 504 may challenge for that node. The challenge may be at any appropriate time, such as after joining a cluster that includes the node $402_1$, and if communication with the node $402_1$ is then lost.

Before challenging however, the node $402_2$ may determine whether the owner is already being challenged by some other (third) node. To this end, step 504 reads the reservation key that is on the disk, and the key is evaluated at step 506. If at step 506 the ReserverID field has the same ID therein as the OwnerID field, then this is an ownership key, not a challenge key, and no challenge is in progress. In such an event, the process branches ahead to step 514 to challenge for ownership, as described below.

If at step 506 the ReserverID field does not have the same ID therein as the OwnerID field, i.e., the reservation key is a challenge key whereby the owning node is already being challenged by another node, such as by the node $402_3$. In this event, the arbitration process of the node $402_2$ branches to step 508 to sleep for some period of time to give the currently challenging other node a chance to win the challenge. Some fixed time or variable time based on virtually any function (e.g., including random) may be used, but the time should be greater than the sleep time of a node when it is challenging (step 518, described below) to ensure that the other challenging node will have time to succeed or fail in its challenge.

After sleeping, at step 510, the reservation key is again read to see what happened during the other node's challenge. If, as determined by step 512 the reserve field equals the owner field, then the node is owned (either by the original owner or the other challenger) and the arbitration process ends at step 526. The arbitration process may be repeated by this node at any suitable time. Note that because of failures and the like, neither the challenger nor the owner may have been able to reserve ownership. When this is detected at step 512, the process branches to step 514.

If the owning node's resource ownership was not being challenged at step 506 as described above, or the ownership was being challenged at step 506 yet ownership was not established at step 512, the process reaches step 514 where the node running this instance of the arbitration process (node $402_2$ in this example) challenges for ownership. This is accomplished by issuing the preempt command with a challenge key, a combination of the challenging node's ID and the current owner's ID. The preempt command thus changes the reservation key from the ReserverID, OwnerID pair [R, O] to the challenging node's ID, OwnerID [MyID, O]. In the present example wherein the node $402_1$ having IDxx is still the owner, and the node $402_2$ is the challenger, the challenge key includes IDyy, IDxx. If the preempt command fails, as detected by step 516, then the key previously read (at step 504 or step 510) was removed from the reservation table, such as by another node's preempt that was successful. In such an event, another challenge is in progress or ownership has been asserted, and the arbitration fails via steps 516 and 526.

If the preempt challenge of step 514 was successful at step 516, the process continues to step 518 to sleep for some time (any suitable fixed or variable time that is less than the sleep time of step 508) to give the owner a chance to replace its reservation. Note that the disk is still owned, but cannot be accessed for I/O by the owner or any other node because the reservation key has changed, unless and until the owner restores the key to its Owner ID, Owner ID pair. This is generally the state represented in FIG. 4B.

After sleeping at step 518, the challenging node $402_2$ re-registers its identifiers (IDyy, IDyy), and reads the reservation key at step 520. Note that the registration will change the reservation key in the reservation table from the challenge key if the challenge key (challenger, owner) is still there, but will not change the reservation key if the owner has restored it (to owner, owner). In other words, in the key table 214, the key is updated to the one specified in the register command, while in the reservation table 216, if the owner has preempted the challenge, the reservation is no longer marked with the challenge key and the entry in the reservation table 216 table is not changed. If after registration and reading of step 520 the OwnerID field does not equal the challenger's ID (IDyy), the owner field had changed (e.g., restored by the owner, as described below). Thus, the arbitration failed, and the arbitration process stops at step 526. Alternatively, if following the registration the owner field equals the challenger's ID (IDyy), then the challenge succeeded, because the former owner did not timely replace its reservation for some reason, and the process continues to step 524 (detailed in FIG. 6) to maintain ownership. A successful challenge by the node $402_2$ is generally represented in FIG. 4C. Note that if the challenge was unsuccessful and the original owner restored its reservation, the state would be again generally represented by FIG. 4A.

FIG. 6 represents the steps taken when ownership is achieved as described above, to maintain/assert ownership. As described above, the owner periodically executes the maintain ownership process to defend against challenges. The process is also run if the owner attempts an input/output (I/O) operation such as read or write but the operation has failed. If properly operating, the period (maintain ownership execution interval) is shorter than the sleep time of a challenger (e.g., half) so that an owner will not lose a reservation.

Step 600 represents determining if a reservation conflict was responsible for an I/O failure. This would be the situation during a challenge, since the reservation key needed to exclusively access the disk would not be the owner's registered MyID, MyID pair (IDxx, IDxx in the current example). In such a situation, the process branches ahead to step 606 to attempt to maintain ownership, as described below.

If at step 600 an I/O failure due to a reservation conflict did not occur, then step 602 tests whether any read/write operations have taken place during the last reservation period. If not, then the device needs to be tested to determine if it is still accessible to the owner, that is, whether it is currently being challenged and is thus not accessible. Step 604 tests the accessibility, such as by reading or writing some data. If still accessible, then the reservation key has not changed because of a challenge, and the process returns from step 606 to await either an I/O reservation conflict failure at step 600 or a sufficiently inactive I/O period step at step 602. If alternatively step 604 determines that the device is not accessible, then step 604 branches ahead to step 606 to attempt to maintain ownership, as described below.

In the event that a challenge appears to be underway, step 606 is executed to read the reservation key, followed by step 608 to evaluate the key contents, in particular the ID in the OwnerID field. This is to determine whether for some reason the owning node is still operating, but somehow lost the ownership, e.g., it was operating too slowly or was otherwise dysfunctional. If another node has changed the OwnerID field, then the device is lost (step 610). If however the Ownerid indicates that the device is still owned, (e.g., O=MyID), step 608 branches to step 612 wherein the owner asserts ownership by restoring, via a preempt command, the ReserverID field with the owner's ID (e.g., IDxx for the node $402_1$). If the preempt command fails, the process loops back to step 606 to re-read the key and again check the ownership. Otherwise, the process has successfully defended the challenge, and returns to step 600 to defend ownership when again appropriate.

In this manner, because of the way in which the reservation key is divided and manipulated, the device is always owned, as either a challenge key ID pair or owner key ID pair is in the reservation table with exclusive access to the disk (or at least whatever part of the disk is being protected). At the same time, a challenger can take away ownership from an improperly operating owner.

Moreover, by further modification of the reservation key, and with slight modifications to the above-described arbitration and ownership maintenance processes, the present invention can be extended to provide additional functionality. One such alternative is shown in FIG. 7, wherein a reservation key 700 is divided into four fields, the above-described Version, ReserverID and OwnerID fields, plus a new "Bid" field 702.

Figure 7:
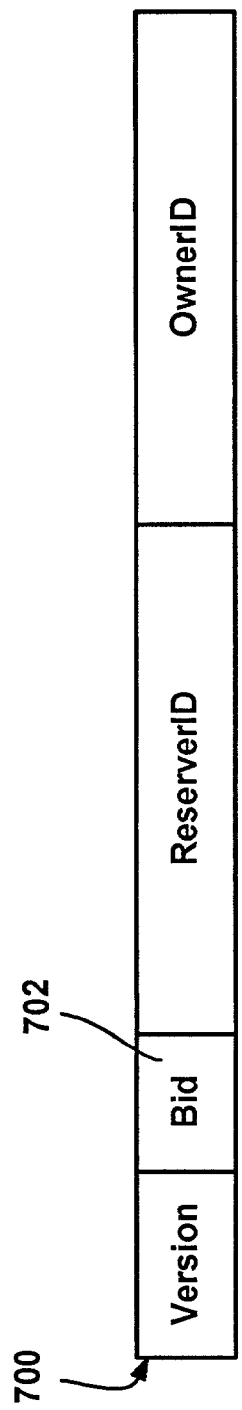
FIGS. 7-9 are representations of various alternate reservation key arrangements that may be used to extend the functionality of the present invention.

In the key 700 of FIG. 7, the Bid field 702 in the reservation key may be used to provide a priority-drive election process. For example, when a challenger reads the current key and sees that the current bid is lower than its own bid, it may preempt the current bid with its own, stronger challenge key. Optionally, the owner can check if a node with a stronger (e.g., higher) bid is challenging it, and if it is, it may then choose not to defend and instead give up the disk. Such a bid-system enables an administrator or the like to bias ownership of the resource to a particular node or group of nodes. Similarly, if a server cluster becomes partitioned into subgroups of nodes, each subgroup may compose a bid having a value based on its relative strength, whereby the strongest surviving subgroup will get the exclusive access.

Figure 8:
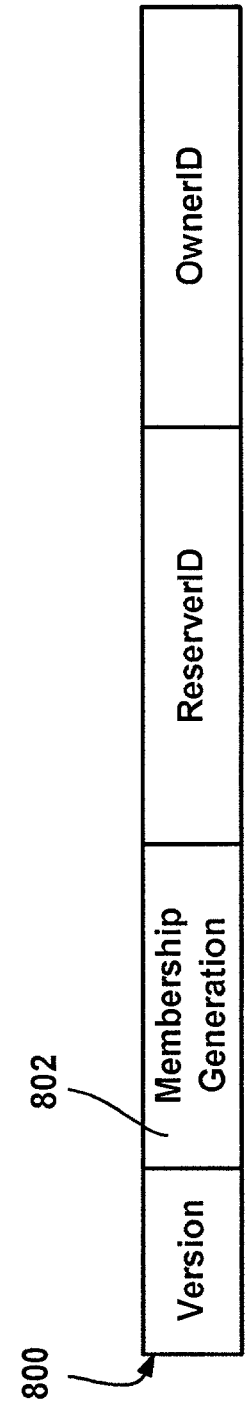

FIG. 8 shows another key alternative, key 800, useful in a shared mode type of operation. More particularly, if a certain group of nodes is allowed to share the same reservation key and work cooperatively on the disk, a key may need to be modified if membership has changed, to prevent evicted members from continuing to access the device. To enable such a change, a membership generation field 802 may be added as shown in FIG. 8. The membership generation field 802 is changed (e.g., incremented or randomly altered) every time a node leaves the group.

Figure 9:
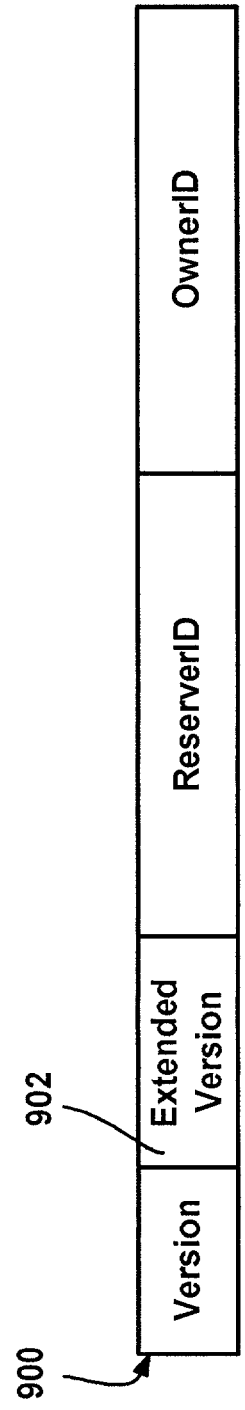

Note that a key can be arranged with field sizes and ordered however desired, and indeed, new keys (such as a combination of FIGS. 7 and 8 with a bid field and a membership generation field) may be developed, as deemed useful. However, as can be appreciated, some consistency to the version field should be provided (e.g., the first six bits of any key) so that it can be consistently found. If over time the version field is not large enough for all needed key variations, as shown in FIG. 9, one key version 900 may be used to indicate that extended version information is available, such as in an extended version field 902.

Similarly, in the SCSI-3 protocol, keys are presently 64 bits in length. If this becomes an insufficient number of bits, then two (or more) reservation keys may be used, such as one for sector zero (or the last sector) and one key for the rest of the sectors. The processes may then be modified accordingly to work with multiple keys, e.g., read one or two keys as needed, change one or two of them as appropriate to challenge or restore ownership, and so on.

For example, in an environment where a disk is shared by a group of members that frequently change, the membership generation field may have to be sufficiently large so that the number does not rapidly cycle back to what it previously was and thereby inadvertently give an excluded member the ability to again access the disk. Multiple keys may thus be used, and these keys may have their bits divided into fields as desired, although dividing multiple keys in such a way that minimizes key reads and writes may be a design consideration. Also, keys may need to be divided such that the membership generation number has to be correct to allow access, since the access enforcement mechanism (e.g., on the disk hardware) will look at only the one key that actually corresponds to the requested access location.

As can be seen from the foregoing detailed description, there is provided a method and system in which a resource may be protected by having the resource exclusively owned at all times, while still enabling a challenger to take over ownership from an owner that is not operating properly. The method and system improve resource protection, and are efficient, flexible and extensible.

While the invention is susceptible to various modifications and alternative constructions, certain illustrated embodiments thereof are shown in the drawings and has been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a distributed computer system having nodes capable of accessing a resource, a method comprising:
    at a first node, executing a first arbitration process and taking ownership of the resource including placing a persistent reservation on the resource that prevents other nodes from accessing the resource and from clearing the persistent reservation through a bus reset;
    at a second node, executing a second arbitration process and challenging the persistent reservation by:
        1) modifying the persistent reservation at the first node into a modified persistent reservation that prevents other nodes from accessing the resource, the modifying of the persistent reservation performed such that the resource cannot be accessed during the transition to the modified persistent reservation; and
        2) enabling the first node to defend its persistent reservation; and
    at the second node, determining whether the first node failed to defend its persistent reservation, and if not defended, taking; ownership of the resource such that the second node places a persistent reservation on the resource that prevents other nodes from accessing the resource.

2. The method of claim 1 wherein the resource is a SCSI device, and wherein placing a persistent reservation on the resource includes issuing a reserve command.

3. The method of claim 1 wherein placing a persistent reservation on the resource includes providing a reservation key.

4. The method of claim 3 wherein modifying the persistent reservation into a modified persistent reservation includes modifying the reservation key.

5. The method of claim 4 wherein modifying the reservation key includes providing a new key.

6. The method of claim 4 wherein modifying the reservation key includes varying the key with a unique identifier for the second node.

7. The method of claim 6 wherein varying the key includes writing the unique identifier for the second node into a key field.

8. The method of claim 4 wherein the resource is a SCSI device, and wherein modifying the reservation key includes issuing a preempt command.

9. The method of claim 4 wherein enabling the first node to defend its persistent reservation includes delaying at the second node.

10. The method of claim 4 wherein determining whether the first node failed to defend its persistent reservation includes reading the reservation key.

11. The method of claim 4 wherein assuming ownership of the resource at the second node includes providing a new reservation key.

12. The method of claim 4 wherein providing a new reservation key includes writing a unique identifier for the second node into a key field.

13. The method of claim 1 further comprising, defending the persistent reservation at the first node, including changing the modified persistent reservation.

14. The method of claim 13 wherein the persistent reservation includes identification data that is modified in the modified persistent reservation, and wherein changing the modified persistent reservation includes restoring the identification data to its state prior to modification.

15. The method of claim 1 wherein the second node determines that no other node is challenging for ownership before challenging for ownership at the second node.

16. The method of claim 1 wherein challenging for ownership at the second node includes submitting a bid in association with the challenge.

17. The method of claim 1 further comprising, challenging the persistent reservation at a third node.

18. A computer-readable storage medium storing computer executable instructions stored thereon for performing the method of claim 1.

19. In a network of distributed computing devices, a system comprising:
   a resource arranged to be owned based on a reservation that includes reservation data associated therewith and that is configured to prevent clearing of the reservation through a bus reset command;
   a first node connected to the resource and having ownership of the resource via first reservation data, and having a first arbitration process therein that is configured to defend ownership of the resource while the first node is operational by restoring any changes to the reservation data back to the first reservation data;
   a second node connected to the resource, the second node having a second arbitration process configured to challenge for ownership of the resource by modification of the reservation data into second reservation data, the modification of the reservation data being such that the resource cannot be accessed during the transition to the second reservation data;
   wherein the second node modifies the first reservation data into the second reservation data, delays and then reads the reservation data to challenge for ownership, the second node obtaining ownership if it reads the second reservation data; and
   wherein when properly operating, the first node defends against the challenge by restoring the second reservation data back to the first reservation data during the second node's delay such that the second node win not read the second reservation data.

20. The system of claim 19 wherein the resource comprises a SCSI device, the reservation data comprises a SCSI reservation key, and wherein the first node and the second node read and write the reservation data via SCSI commands.

21. The system of claim 19 wherein the resource is a disk drive.

22. The system of claim 19 wherein the first and second nodes are configured to operate in a server cluster.

23. The system of claim 19 further comprising a third node connected to the resource, the third node having a third process configured to challenge for ownership of the resource by modification of the reservation data into third reservation data.

24. A computer-readable storage medium storing a data structure, comprising,
   a reserver data field containing a reserver identifier that is configured in such a way as to prevent the owner identifier from being cleared through a bus reset;
   a owner data field containing an owner identifier; and
   the data structure associated with a resource and used for establishing ownership of the resource and for arbitrating for ownership of the resource, ownership being established by having the reserver identifier in the reserver data field equal to the owner identifier in the owner data field, and wherein arbitrating for ownership includes:
      an owner, when operational, executing a first arbitration process and reading the reserver data field to see if it the reserver identifier in the reserver data field equals the owner identifier, and if not, writing the owner identifier into the reserver data field to win the arbitration and establish ownership; and
      a challenger executing a second arbitration process by writing a challenger identifier into the reserver data field, delaying and then reading the reserver data field to see if the reserver identifier in the reserver data field equals the challenger identifier, and if so, the challenger winning the arbitration and establishing ownership by writing the challenger identifier into the owner data field.

25. The computer-readable storage medium of claim 24, wherein the data structure further comprises a version field having information therein that corresponds to an arrangement of the data structure fields.

26. The computer-readable storage medium of claim 24, wherein the data structure further comprises a bid data field having information therein corresponding to a relative strength value.

27. The computer-readable storage medium of claim 24 wherein the owner and challenger are nodes, and the owner node shares access of the resource with other member nodes in a group, and wherein the data structure further comprises, a member generation data field having information therein that is updated when a former member node leaves the group to prevent further access by the former member.

28. The computer-readable storage medium of claim 24 wherein the reserver data field and the owner data field are incorporated into a reservation key.

29. The computer-readable storage medium of claim 24 further comprising another challenger writing another challenger identifier into the reserver data field, delaying and then reading the reserver data field to see if it equals the other challenger identifier, and if so, the other challenger winning the arbitration and establishing ownership by writing the other challenger identifier into the owner data field.

30. In a distributed computer system having nodes capable of accessing a storage device, a method comprising:
   at a first node when executing a first arbitration process, placing a persistent reservation on the storage device that is configured in such a way as to prevent the persistent reservation from being cleared through a bus reset including writing a first node identifier into reserver and owner fields of a reservation key that determines access to the device, accessing the device via the reservation key, and defending against challenges by writing the first node identifier into the reserver field when the first node detects that the first node identifier is in the owner field but not in the reserver field; and
   at a second node when executing a second arbitration process, challenging the persistent reservation key by writing a second node identifier into the reserver field of the reservation key, delaying, and determining whether the first node has failed to replace the second node identifier in the reserver field during the delay, and if not replaced, taking ownership of the storage device including writing the second node identifier into the owner field.

31. The method of claim 30 further comprising, at a third node, challenging the persistent reservation key by writing a third node identifier into the reserver field of the reservation key, delaying, and determining whether the first node has failed to replace the third node identifier in the reserver field during the delay, and if not replaced, taking ownership of the storage device including writing the third node identifier into the owner field.

* * * * *